United States Patent
Torres Fernandez et al.

(10) Patent No.: US 9,850,695 B2
(45) Date of Patent: Dec. 26, 2017

(54) DOOR RESTRAINT MECHANISM

(71) Applicant: FORD GLOBAL TECHNOLOGIES, LLC, Dearborn, MI (US)

(72) Inventors: Yunuen Torres Fernandez, Birmingham, MI (US); Saulo Da Cortes Cervantes, Tlalnepantla de Baz (MX); Jorge Guillermo Barrios Albert, Azcapotzalco (MX)

(73) Assignee: Ford Global Technologies LLC, Dearborn, MI (US)

( * ) Notice: Subject to any disclaimer, the term of this patent is extended or adjusted under 35 U.S.C. 154(b) by 54 days.

(21) Appl. No.: 15/069,362

(22) Filed: Mar. 14, 2016

(65) Prior Publication Data

US 2017/0260792 A1   Sep. 14, 2017

(51) Int. Cl.
| | |
|---|---|
| *E05F 5/00* | (2017.01) |
| *B60J 5/04* | (2006.01) |
| *E05C 17/20* | (2006.01) |
| *E05F 15/70* | (2015.01) |

(52) U.S. Cl.
CPC ............. *E05F 5/00* (2013.01); *B60J 5/047* (2013.01); *E05C 17/203* (2013.01); *E05F 15/70* (2015.01); *E05Y 2201/21* (2013.01); *E05Y 2900/531* (2013.01)

(58) Field of Classification Search
CPC .... E05C 17/203; E05C 17/006; E05C 17/003; E05C 17/00; E05C 17/025; E05C 17/22; E05F 5/00; E05F 5/025; B60J 5/047; E05Y 2900/531; E05Y 2201/21; E05Y 2201/246; E05Y 2201/462; Y10T 16/61; Y10T 16/625; Y10T 16/6295; Y10T 16/27

See application file for complete search history.

(56) References Cited

U.S. PATENT DOCUMENTS

| | | | | |
|---|---|---|---|---|
| 2,086,025 | A | * | 7/1937 | Gano, Jr. ................ E05F 15/47 296/146.4 |
| 2,237,046 | A | * | 4/1941 | Breitenwischer ..... E05C 17/203 16/331 |
| 2,237,576 | A | * | 4/1941 | Rakoczy ............... E05F 15/627 16/78 |

(Continued)

FOREIGN PATENT DOCUMENTS

| | | |
|---|---|---|
| CA | 2449776 A1 | 12/2002 |
| CA | 2379446 C | 8/2007 |

(Continued)

OTHER PUBLICATIONS

English machine translation of DE102005023002A1.
English machine translation of DE102009041036A1.
English machine translation of KR20150081241A.

*Primary Examiner* — Justin B Rephann
(74) *Attorney, Agent, or Firm* — Jason Rogers; King & Schickli PLLC

(57) ABSTRACT

A door restraint system includes a retractor, a retractor brake, and a retractor-deployed stay for selectively restraining opening of a vehicle door. The retractor-deployed stay is configured to spool to and from the retractor as vehicle door is translated between a closed configuration and one or more opened configurations. Door check systems including the door restraint system are described.

14 Claims, 7 Drawing Sheets

(56) References Cited

U.S. PATENT DOCUMENTS

| | | | | |
|---|---|---|---|---|
| 2,580,593 | A * | 1/1952 | Putnam | E05F 1/1207 16/85 |
| 2,675,578 | A * | 4/1954 | Atwood | E05F 1/1207 16/85 |
| 3,061,362 | A * | 10/1962 | Kunimori | E05F 15/47 296/146.4 |
| 4,211,431 | A * | 7/1980 | Awano | B60R 22/04 280/804 |
| 4,406,420 | A * | 9/1983 | Villano | E05D 15/1081 242/371 |
| 4,458,446 | A * | 7/1984 | Mochida | B60K 28/00 49/28 |
| 4,872,239 | A * | 10/1989 | Ferguson | E05F 1/105 16/64 |
| 5,228,239 | A * | 7/1993 | Heo | E05F 15/47 49/280 |
| 6,068,321 | A * | 5/2000 | Ooms | B62D 33/0273 296/146.4 |
| 6,318,025 | B1 * | 11/2001 | Sedlak | E05F 15/627 296/56 |
| 6,854,781 | B2 * | 2/2005 | Roach | B62D 33/0273 296/50 |
| 7,640,627 | B2 * | 1/2010 | Lowen | E05C 17/203 16/334 |
| 8,234,817 | B2 * | 8/2012 | Neundorf | E05B 81/20 49/28 |
| 8,366,176 | B2 | 2/2013 | Kaburaki | |
| 8,733,818 | B2 * | 5/2014 | Hooton | E05C 17/203 16/86 C |
| 8,764,090 | B2 * | 7/2014 | Kerr | E05F 15/627 296/146.4 |
| 9,522,704 | B1 * | 12/2016 | Krajenke | B62D 33/0273 |
| 2003/0192750 | A1 * | 10/2003 | Doornbos | E05F 1/14 188/82.1 |
| 2004/0189035 | A1 * | 9/2004 | Kurachi | B60R 7/06 296/37.12 |
| 2005/0127711 | A1 * | 6/2005 | Rigorth | E05F 15/63 296/146.4 |
| 2005/0242618 | A1 * | 11/2005 | Menard | E05F 15/43 296/146.4 |
| 2006/0033612 | A1 | 2/2006 | Santa | |
| 2006/0230574 | A1 * | 10/2006 | Murayama | E05C 17/203 16/58 |
| 2007/0063536 | A1 * | 3/2007 | Okada | E05F 15/619 296/146.4 |
| 2007/0176463 | A1 * | 8/2007 | Averitt | E05F 15/643 296/146.4 |
| 2007/0186480 | A1 | 8/2007 | Freeman | |
| 2008/0061180 | A1 * | 3/2008 | Webber | B60R 22/3413 242/379.1 |
| 2009/0007489 | A1 * | 1/2009 | Kern | E05C 17/30 49/31 |
| 2009/0051192 | A1 * | 2/2009 | Ewing | E05C 17/006 296/146.2 |
| 2009/0260289 | A1 | 10/2009 | Carpenter et al. | |
| 2010/0031468 | A1 * | 2/2010 | Tomiji | E05F 5/027 16/52 |
| 2010/0076651 | A1 * | 3/2010 | Nakakura | E05C 17/00 701/49 |
| 2010/0156139 | A1 * | 6/2010 | Herrmann | E05F 15/70 296/146.4 |
| 2011/0266080 | A1 * | 11/2011 | Schmitt | E05C 17/006 180/89.1 |
| 2012/0175204 | A1 * | 7/2012 | Arnold | F16F 9/32 188/271 |
| 2013/0038081 | A1 * | 2/2013 | Kerr, III | B60J 5/108 296/57.1 |
| 2013/0055530 | A1 * | 3/2013 | Gruber | E05C 17/203 16/85 |
| 2013/0074412 | A1 * | 3/2013 | Wellborn | E05C 17/003 49/381 |
| 2014/0053370 | A1 * | 2/2014 | Tseng | E05C 17/203 16/82 |
| 2014/0096342 | A1 * | 4/2014 | Kim | E05C 17/203 16/82 |
| 2017/0030737 | A1 * | 2/2017 | Elie | E05F 15/70 |

FOREIGN PATENT DOCUMENTS

| | | |
|---|---|---|
| CA | 2641260 C | 10/2013 |
| CA | 2667252 C | 5/2014 |
| CA | 2717218 | 5/2014 |
| DE | 102005023002 A1 | 6/2006 |
| DE | 102009041036 A1 | 3/2011 |
| EP | 2666945 A1 | 11/2013 |
| KR | 20150081241 A | 7/2015 |

* cited by examiner

DOOR RESTRAINT MECHANISM

TECHNICAL FIELD

This disclosure relates generally to doors for motor vehicles. More particularly, the disclosure relates to a restraint mechanism for a door which at need instantly arrests an opening motion of the door. The described mechanism may be associated with a vehicle door check mechanism. In embodiments, the described system includes one or more proximity sensors for detecting obstacles disposed in a path of travel of the opening door. The one or more proximity sensors are operatively connected to cause actuation of the restraint mechanism, preventing the door from continuing to swing open when an obstacle is detected within the path of travel of the opening door.

BACKGROUND

Vehicle doors may be equipped with door checks, which as is known typically comprise a mechanism configured to define one or more preset door opening configurations. With reference to FIG. 1A, a representative door check mechanism 100 includes a check arm 102 connected at a first end 104 to a vehicle 106 and at an opposed end 108 to a vehicle door (not shown in this view). Rollers 112 are disposed whereby a biasing mechanism such as opposed springs 114 urge the rollers into contact with the check arm 102.

As shown in FIG. 1B, check arm 102 defines a plurality of detents 116 and interposed recesses 118, with each recess defining a present door stop position. That is, as the vehicle door (not shown in this view) opens from a fully closed to a fully open configuration, the rollers 112 are translated over the detents 116 and are received within the recesses 118, at least temporarily stopping the door from opening further unless the user continues to urge the door open. Thus, each recess 118 defines a preset stop position at which the opening motion of the door 110 can be at least temporarily arrested. As shown in FIG. 1C, in the depicted embodiment two preset door stop positions are defined, a fully open position 120 and an intermediate position 122.

In such conventional door check systems 100, as the door 110 is opened the rollers 112 will tend to continue to traverse over the check arm 102 until they reach the nearest recess 118. That is, there is typically no mechanism provided to arrest motion of the rollers 112 other than the recesses 118, for example to keep the rollers 112 on a surface of the detents 116 rather than continuing until they rest in a recess 118. Therefore, in such mechanisms once the door 110 has been urged past intermediate open position 122, it will continue to open to final open position 120 unless physically stopped by a vehicle occupant. The same is true if the door 110 is urged from the fully closed position to the intermediate position 122.

While substantially effective, such mechanisms are ineffective if there is an obstacle positioned in the door 110's path of travel between the fully closed configuration and the intermediate position 122 or between the intermediate position and the fully open position 120. This can occur if the vehicle 106 is parked very close to the obstacle, for example an adjacent structure or vehicle. If the vehicle occupant is unaware of the adjacent obstacle or is physically unable to prevent the door 110 from opening to the next preset position, because the rollers 112 tend to travel to the next available recess 118 as described above, the door may contact the obstacle resulting in damage to the door, to the obstacle, or to both.

There is accordingly identified a need in the art for a way to arrest opening of a door 106 other than at the preset open configurations defined by a door check mechanism 100. To solve this and other problems, the present disclosure relates to a door restraint system which advantageously provides a mechanism to instantly restrict movement of the door regardless of preset door open positions, thus preventing contact with an adjacent obstacle.

SUMMARY

In accordance with the purposes and benefits described herein, in one aspect a door restraint system for a vehicle is described, comprising a retractor, a retractor brake, a retractor brake actuator, and a retractor-deployed stay for selectively restraining opening of a vehicle door. The retractor-deployed stay is configured to spool to and from the retractor as the vehicle door is translated between a closed configuration and one or more opened configurations.

In embodiments, the retractor is associated with one of a vehicle body or the vehicle door. In embodiments, the retractor comprises a torsion bar for spooling the retracting stay and a ratchet for engaging the retractor brake. In embodiments, the retractor brake comprises a linear actuator operatively connected to the brake actuator. The linear actuator may be a linear solenoid or any suitable linear actuator. The brake actuator may be manually actuated or automatically actuated. In embodiments of an automatically actuated brake actuator, the brake actuator may comprise a vehicle door-mounted proximity sensor operatively connected to a controller, which in turn is operatively connected to the retractor brake.

In another aspect, a door check system for a vehicle is described, comprising a door check mechanism providing one or more pre-determined vehicle door open positions and a door restraint system as described above. In embodiments, the door check may be a door check arm or strap defining one or more detents engaged by one or more biased rollers. In embodiments, the door restraint system is integrated into the door check mechanism, and instantly restricts any opening movement of the door regardless of preset door open positions, thus preventing contact with an adjacent obstacle.

In the following description, there are shown and described embodiments of the disclosed door restraint system. As it should be realized, the system is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed door restraint system, and together with the description serve to explain certain principles thereof. In the drawing.

Reference will now be made in detail to embodiments of the disclosed door restraint system, examples of which are illustrated in the accompanying drawing figures.

DETAILED DESCRIPTION

Figure 1A:
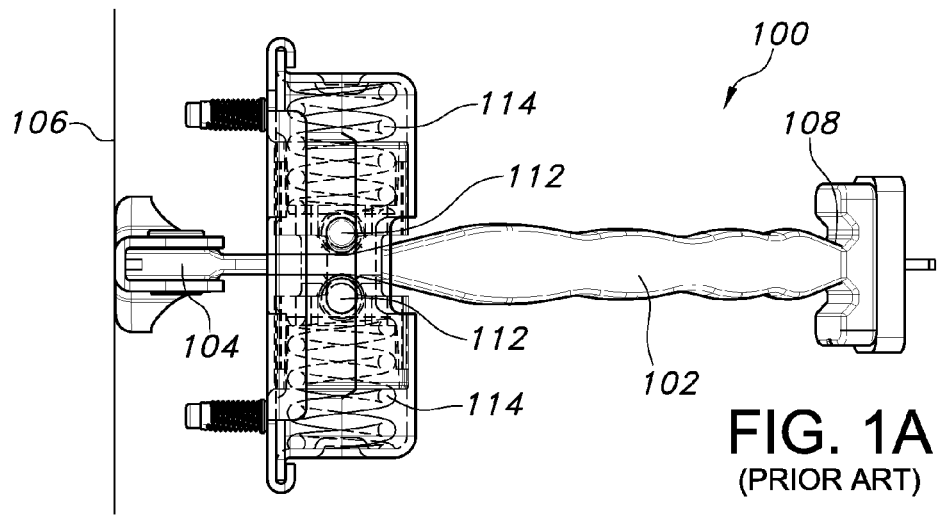
FIG. 1A shows a prior art vehicle door check mechanism.
Figure 1B:
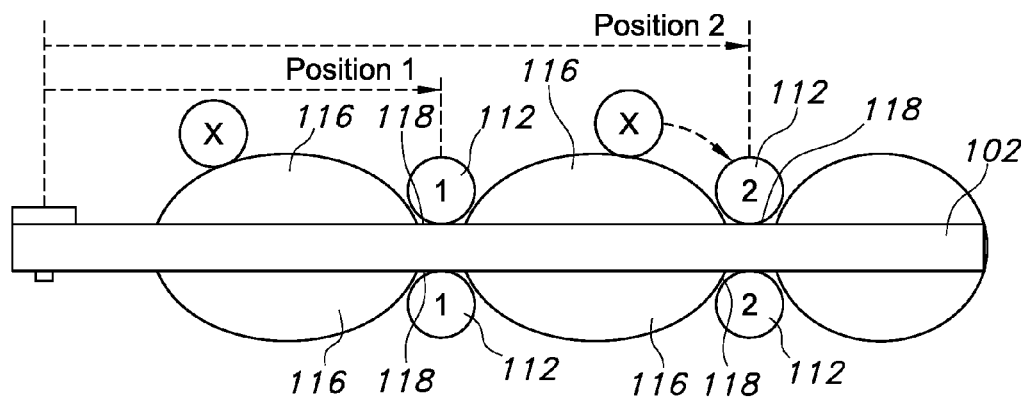
FIG. 1B shows a prior art check arm for the mechanism of FIG. 1A.
Figure 1C:
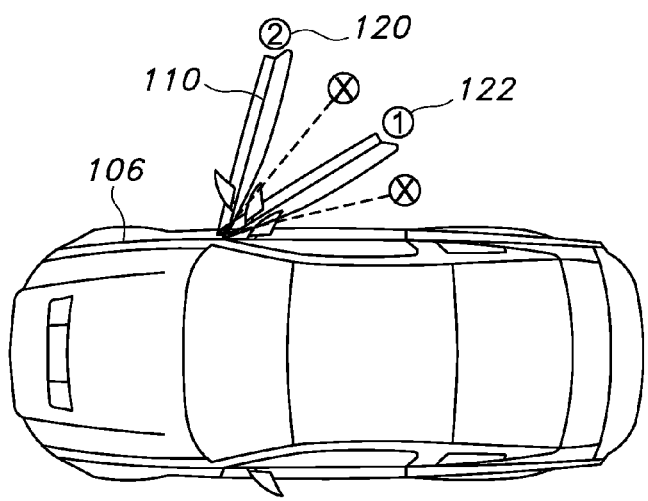
FIG. 1C shows vehicle door preset open positions provided by the mechanism of FIG. 1A.

Preliminarily, as summarized above the present disclosure is directed to a door restraint system used in conjunction with a check arm mechanism as shown in FIGS. 1A and 1B. However, it will be readily appreciated by the skilled artisan that the described system is easily adaptable to any mechanism used for determining vehicle door preset open positions, for example straps, link arm arrangements including detents, rod and spring-arm arrangements, and other such mechanisms defining preset door open positions. Likewise, it will be appreciated on consideration of the present disclosure that the described door restraint system may be used even in vehicles that lack a door check mechanism.

At a high level the presently disclosed door restraint system 200 includes a retractor 202, a retractor brake 204, and a retractor-deployed stay 206. The retractor brake 204 comprises a linear actuator and a braking mechanism, embodiments of which will be described infra. The retractor-deployed stay 206 spools to and from the retractor 202 as a vehicle door (not shown in this view) opens and closes. When the brake 204 is not actuated, the retractor 202 freely rotates (arrows A) as needed to spool the stay 206 onto and off of (see arrow B) the retractor as a vehicle door 110 is translated between a closed and one or more open configurations. When the retractor brake 204 is engaged (FIG. 2B), as shown in the depicted embodiment the brake engages the retractor 202, preventing the stay 206 from spooling off of the retractor (arrow C) and so preventing the vehicle door from any further opening movement.

Figure 2A:
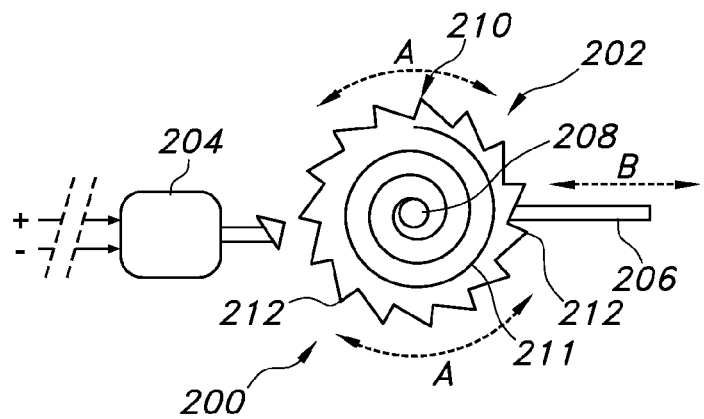
FIG. 2A depicts a portion of a door restraint system according to the present disclosure.
Figure 2B:
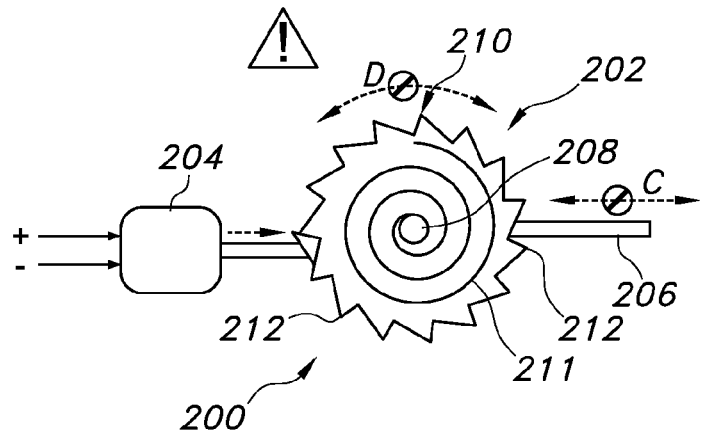
FIG. 2B depicts the door restraint system of FIG. 2A in an engaged, non-rotating configuration.

In one embodiment (see FIGS. 2A-2B), the retractor 202 includes a torsion bar 208 and the retractor brake 204 braking mechanism comprises a ratchet 210 associated with the retractor. This embodiment is somewhat similar in configuration to known mechanisms for spooling/unspooling vehicle seat belt straps, and may include a biasing member such as a torsion spring 211 configured to urge the torsion bar 208 to retract the stay 206 absent a countering biasing force. In that embodiment, as shown in FIG. 2B the retractor brake 204, configured as a linear actuator, engages one or more teeth 212 of the ratchet 210 to prevent unspooling rotation (arrow D) of the torsion bar 208. The retractor brake 204 may be any suitable linear actuator, for example a linear solenoid actuator. However, other linear actuator types are contemplated including without intending any limitation a mechanical actuator such as a screw or cam linear actuator, hydraulic or pneumatic actuators, electro-mechanical actuators, linear motor actuators, telescoping linear actuators, and others.

Figure 2C:
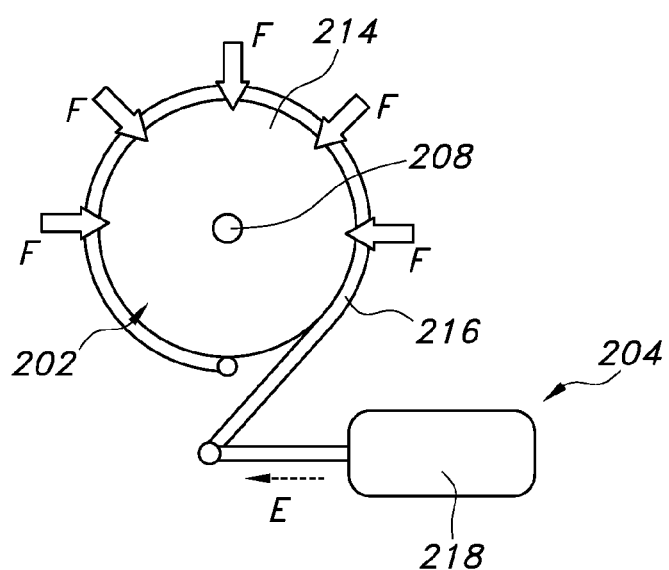
FIG. 2C depicts an alternative embodiment of the door restraint system of FIG. 2A.

It will be appreciated that alternative embodiments of the retractor brake 204/braking mechanism and retractor 202 assembly are possible, and are contemplated for use herein. For example, in one possible embodiment (see FIG. 2C) the retractor 202 may comprise a disc or drum 214 in place of the ratchet 210, and the retractor brake 204 braking mechanism may comprise a band 216 connected at a first end to a portion of the disc or drum and at a second end to a linear actuator 218. As shown, an intermediate portion of the band 216 is at least partially wound about the disc or drum 214. As described above, the retractor-deployed stay 206 (not shown in this view) spools to and from the retractor 202 as a vehicle door 110 (not shown in this view) opens and closes. When the brake 204 is not actuated, the disc or drum 214 freely rotates as needed to spool the stay 206 onto and off of the retractor as a vehicle door 110 is translated between a closed and one or more open configurations. When the retractor brake 204 is engaged, the linear actuator 218 actuates (see arrow E) and concentrically tightens the band 216 about the disc or drum 214 to prevent rotation thereof, and so to prevent the stay 206 from spooling off of the retractor. This stops further opening movement of the vehicle door 110.

Figure 2D:
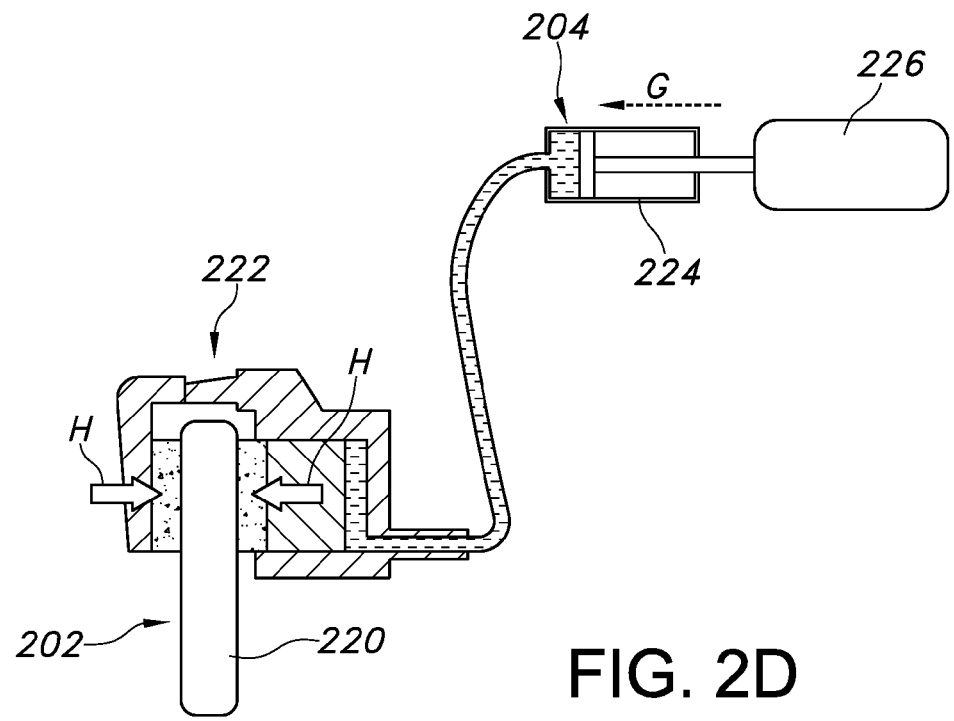
FIG. 2D depicts another alternative embodiment of the door restraint system of FIG. 2A.

In yet another alternative embodiment (see FIG. 2D), the retractor 202 may comprise a disc or drum 220 in place of the ratchet 210, and the retractor brake 204 braking mechanism may be provided as a caliper-style brake assembly including a disk-engaging caliper assembly 222, a master cylinder 224 for actuating the disk-engaging caliper assembly, and a linear actuator 226 configured to actuate the master cylinder and thereby the caliper assembly. As described above, the retractor-deployed stay 206 (not shown in this view) spools to and from the retractor 202 as a vehicle door 110 (not shown in this view) opens and closes. When the brake 204 is not actuated, the disc or drum 220 freely rotates as needed to spool the stay 206 onto and off of the retractor as a vehicle door 110 is translated between a closed and one or more open configurations. When the retractor brake 204 is engaged, the linear actuator 226 actuates (see arrow G) and causes the master cylinder to in turn actuate the disk-engaging caliper assembly 222 (arrows H) to prevent rotation of the disk 220, and so to prevent the stay 206 from spooling off of the retractor. This stops further opening movement of the vehicle door 110.

Manual and automated embodiments of the described door restraint system 200 are contemplated. In a manual embodiment, a switch 300 is provided, accessible by a vehicle occupant O (see FIG. 3A). The switch may be positioned at any suitable location in a vehicle 106 for convenient access by the occupant O, for example in association with the door 110, on the vehicle dash panel (embodiment not shown), on a key fob, as part of a smart key, etc.

Figure 3A:
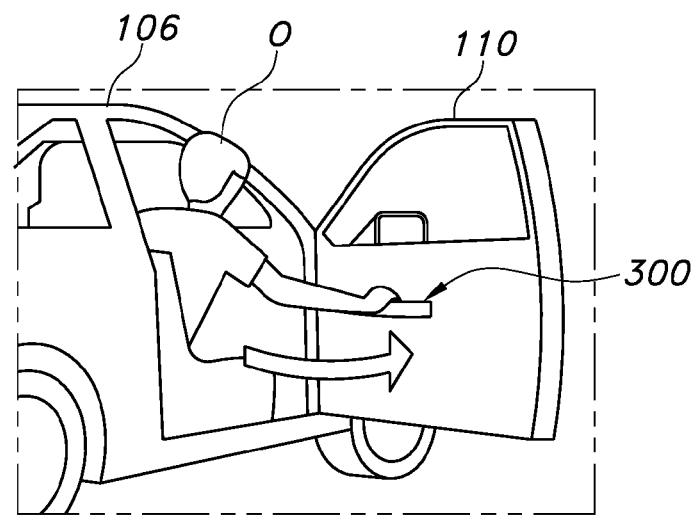
FIG. 3A depicts a manually actuated embodiment of the door restraint system of FIG. 2A.
Figure 3B:
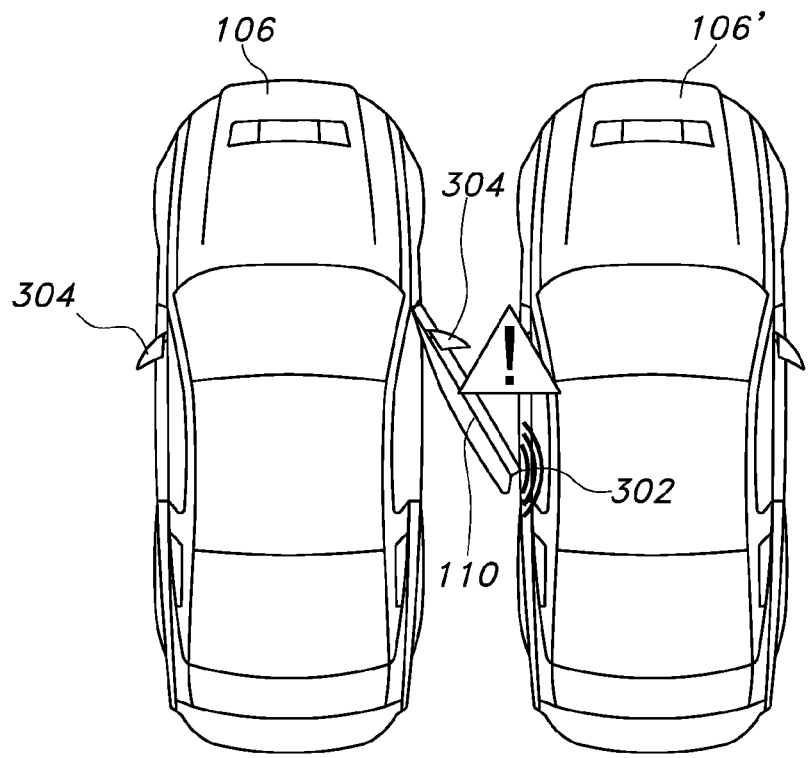
FIG. 3B depicts an automated embodiment of the door restraint system of FIG. 2A.

In an automated embodiment as shown in FIG. 3B, the presently described door restraint system 200 utilizes one or more door 110-mounted proximity sensors 302. A variety of suitable proximity sensors based on a variety of technologies are known, including without intending any limitation camera-based systems, laser-based systems (LIDAR), radar-based systems, sonar-based systems, infrared sensors, electromagnetic sensors, and ultrasound-based systems. Use of any such sensors is contemplated. Such sensors are well-known to the skilled artisan, and therefore the specific construction of such need not be described in detail herein and these descriptions will not be taken as limiting in that regard. At a high level, as is known such sensors are configured to detect obstacles passing within a predefined distance of the sensor, and to emit a signal when such an object within the predefined distance is detected.

The one or more door 110-mounted proximity sensors 302 may be disposed in association with the vehicle door 110 in a number of suitable positions. This may include on or in the side mirror 304, or on or in a portion of the door 110 frame or interior structure. In the depicted embodiment the proximity sensor 302 is disposed on or in a portion of the door 110 that is furthest from the hinged mounting of the door to the vehicle 106 as shown in FIG. 3B, since that is the portion of the door likely to first contact an adjacent obstacle such as another vehicle 106'. Of course, multiple proximity sensors 302 may be disposed in or on the door 110, to account for the potential presence of obstacles of different height and/or potential proximity to a door, such as hydrants, curbs, etc.

Figure 3C:
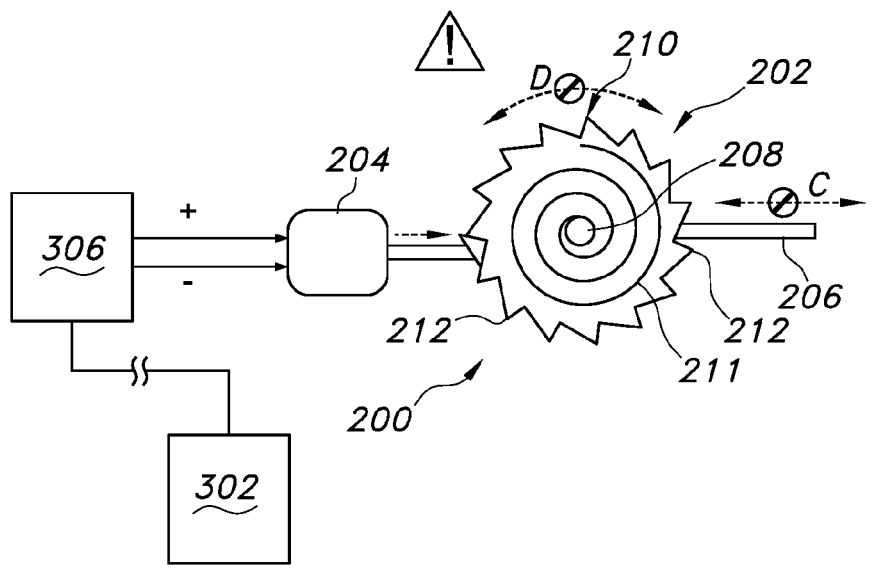
FIG. 3C depicts a controller arrangement for controlling the automated door restraint system of FIG. 3B.

In this embodiment, the one or more proximity sensors 302 are operatively connected to a controller 306 (see FIG. 3C), such as a microcontroller of substantially known design and operation. In turn, the controller 306 is operatively connected to the retractor brake 204. When the one or more proximity sensors 302 do not detect an adjacent obstacle, the retractor 202 freely rotates as needed to spool the stay 206 onto and off of the torsion bar 208 as a vehicle door 110 is translated between a closed and one or more open configurations. When the one or more proximity sensors 302 detect an adjacent obstacle 106', a signal is sent to the controller 306 which in turn causes the retractor brake 204 to engage the retractor 202 (FIG. 3C). This prevents the retractor 202 from rotating (arrow D) to spool the stay 206 off of the retractor, thus preventing the vehicle door 110 from any further opening movement.

Figure 4A:
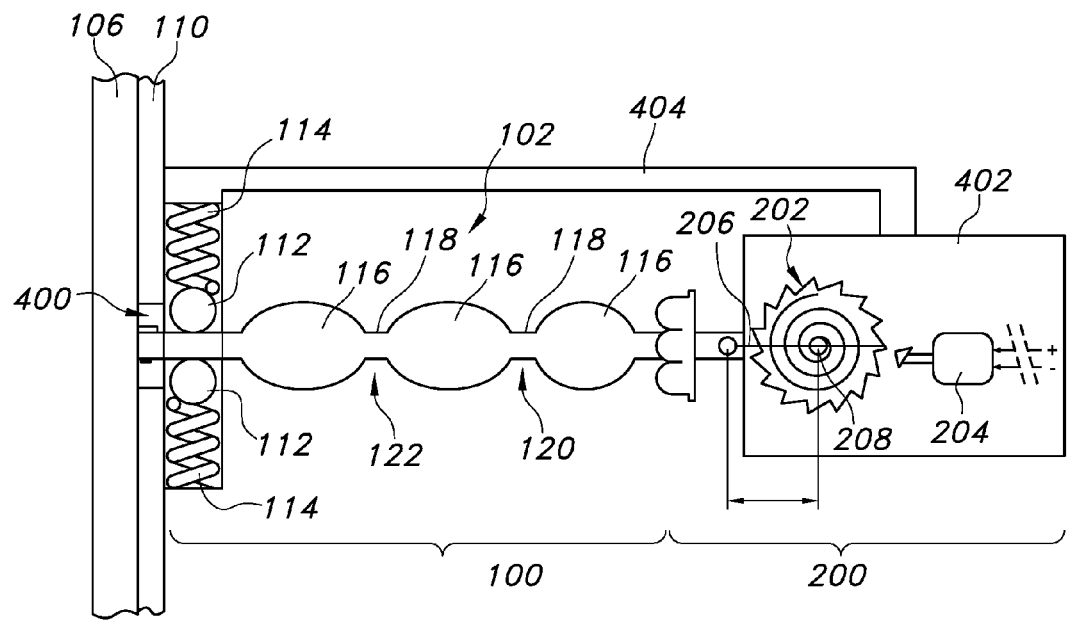
FIG. 4A depicts a door restraint system as shown in FIG. 2A integrated into a door check mechanism as shown in FIG. 1A, associated with a vehicle door in a closed position.
Figure 4B:
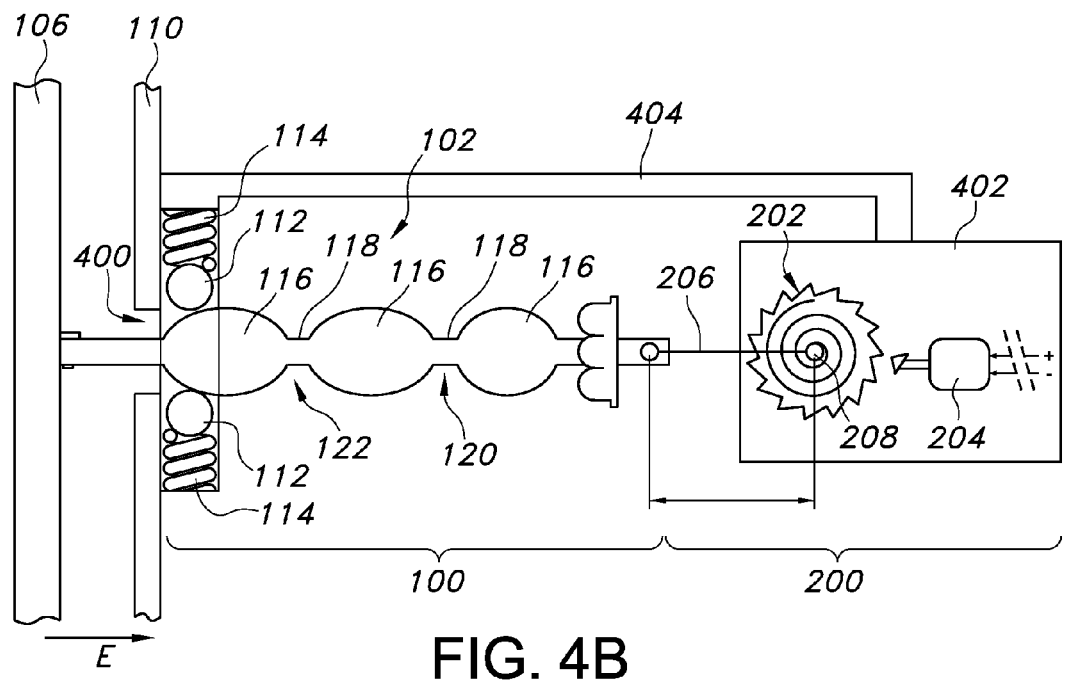
FIG. 4B depicts the systems of FIG. 4A associated with a vehicle door opening in the absence of a detected obstacle.
Figure 4C:
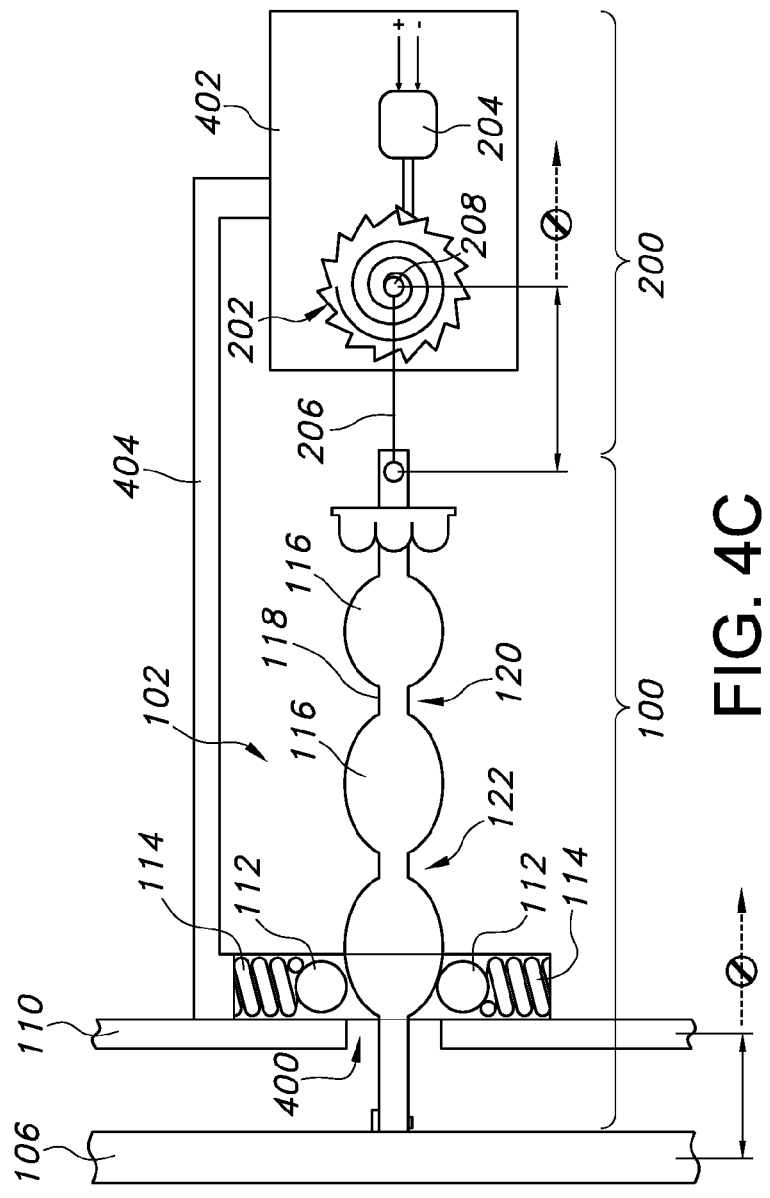
FIG. 4C depicts the systems of FIG. 4A associated with a vehicle door opening in the presence of a detected obstacle, with the door being restrained from further opening prior to reaching a first preset stop position of a check arm.
Figure 4C:
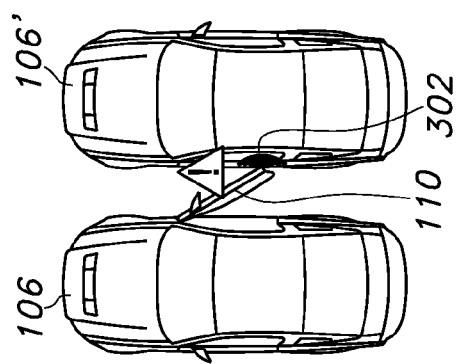

As will be appreciated, the above-described door restraint system 200 is suitable for use as a stand-alone feature, i.e. in association with a vehicle door 110 that does not include any other types of restraint systems. However, it is also contemplated to use the described door restraint system 200 in association with vehicles 106 equipped with door check systems such as the check arm mechanism 100 as described above and as shown in FIGS. 1A and 1B. In an embodiment as depicted in FIGS. 4A-4C, an integrated door check arm mechanism 100 and door restraint system 200 are provided, each integrated into a vehicle door 110 structure. The components of the door check arm mechanism 100 and door restraint system 200 are substantially as described above and illustrated herein.

In the embodiment shown in FIGS. 4A and 4B, the door restraint system 200 is integrated into a substantially conventional check arm mechanism 100 as illustrated in FIGS. 1A and 1B. FIG. 4A illustrates the integrated mechanism with the vehicle door 110 in a closed position, abutting the vehicle 106 body. A check arm 102 defining various present door-open positions 120, 122 by way of detents 116 is attached at one end to a portion of the vehicle body 106 and at a second end to a portion of the vehicle door 110. The check arm 102 in the depicted embodiment traverses an aperture 400 in the door 110 for attachment to the vehicle 106 body. The door restraint mechanism 200 is held in a housing 402 associated with an interior of the vehicle door 110. The check arm mechanism 100 is held at a fixed spaced distance from the door restraint housing 402 by a bracket 404. The retractor-deployed stay 206 is connected at a first end to the check arm 102 and at an opposed end to a portion of the retractor 202, such as to the torsion bar 208.

If no adjacent obstacle likely to be contacted by the door 110 is observed or detected, the door opens to the desired preset door-open positions 120, 122 by operation of check arm 102 as described above (see FIG. 4B). As the door 110 opens and subsequently closes, the retractor 202 unspools and then respools the stay 206.

Figure 4D:
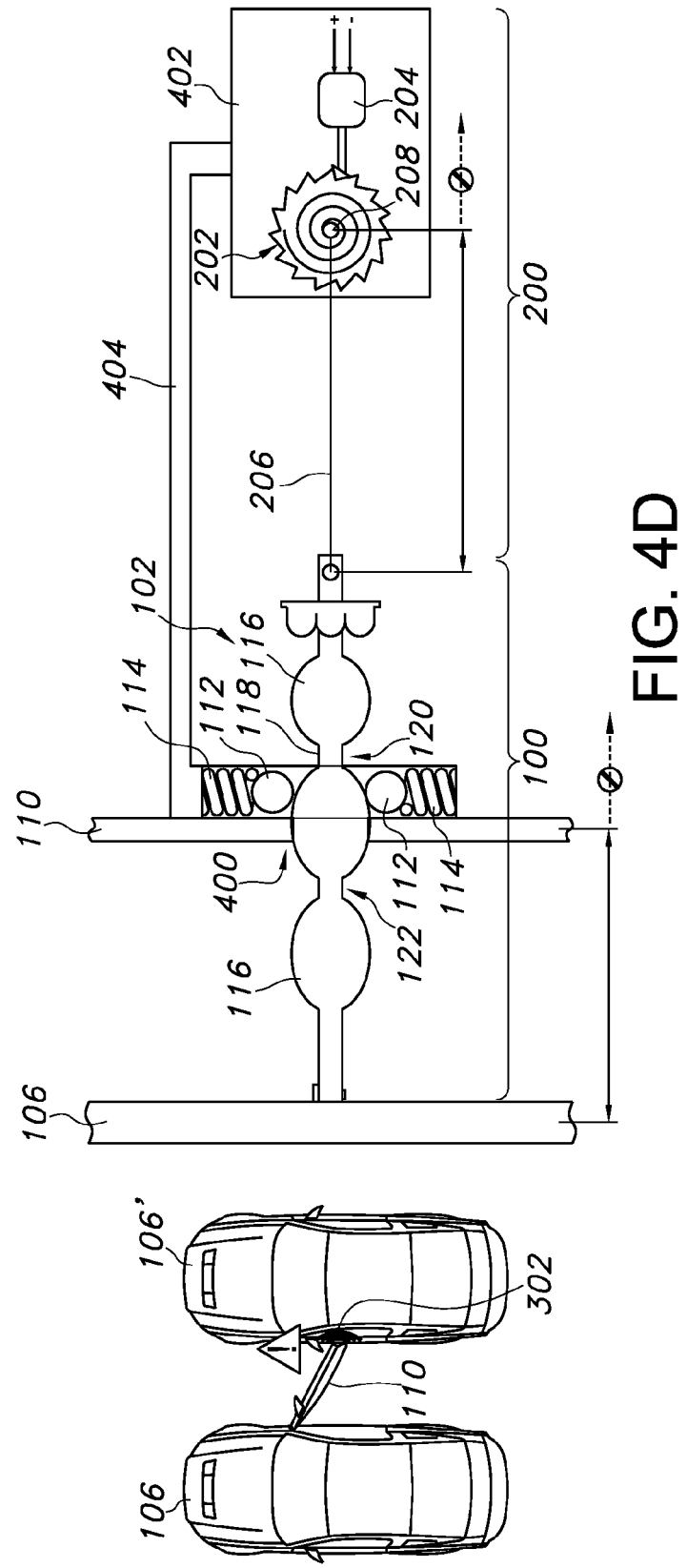
FIG. 4D depicts the systems of FIG. 4A associated with a vehicle door opening in the presence of a detected obstacle, with the door being restrained from further opening prior to reaching a second preset stop position of a check arm.

However, if an adjacent obstacle is detected, as shown in FIGS. 4C-4D the retractor brake 204 is actuated (either manually as depicted in FIG. 3A or automatically by way of one or more proximity sensors 302/controller 306 as depicted in FIGS. 3B-3C), preventing rotation of the retractor 202 and therefore unspooling of the stay 206. This in turn arrests the opening motion of the door 110. Advantageously, this can occur at any point along the path of travel of the check arm 102, even at points other than the preset door-open positions 120, 122 when the rollers 112 are positioned on the detents 116 rather than in the recesses 118 of the check arm. Thus, rather than requiring the check arm 102 to travel to a present door-open position 120, 122 to stop the door 110, which might allow the door to contact an adjacent obstacle, the door's opening motion can be restrained at any needed point along the path of travel of the check arm 102 to prevent such contact.

Obvious modifications and variations are possible in light of the above teachings. For example, the described door restraint system 200 could be associated with the vehicle 106 body and the check arm mechanism 100 could be associated with the vehicle door 110, rather than the configuration shown in FIGS. 4A and 4B. As noted above, a single proximity sensor 302 could be disposed on or in the door 110, or an array of proximity sensors 302 may be provided to allow detection of adjacent objects of varying height. All such modifications and variations are within the scope of the appended claims when interpreted in accordance with the breadth to which they are fairly, legally and equitably entitled.

What is claimed:

1. A door restraint system for a vehicle, comprising:
   a retractor comprising a torsion bar;
   a retractor brake comprising a linear actuator operatively connected to a braking mechanism; and
   a retractor-deployed stay spooled by the torsion bar for selectively restraining opening of a vehicle door.

2. The system of claim 1, wherein the retractor-deployed stay spools to and from the retractor as the vehicle door is translated between a closed configuration and one or more opened configurations.

3. The system of claim 1, wherein the retractor is associated with one of a vehicle body or the vehicle door.

4. The system of claim 1, wherein the linear actuator is a linear solenoid.

5. The system of claim 1, wherein the retractor brake is manually actuated.

6. The system of claim 1, wherein the retractor brake is operatively connected to a controller which in turn is configured to receive an input from a vehicle door-mounted proximity sensor.

7. A motor vehicle including the system of claim 1.

8. A door check system for a vehicle, comprising:
a door check mechanism providing one or more predetermined vehicle door open positions; and
a door restraint system, comprising:
a retractor comprising a torsion bar;
a retractor brake comprising a linear solenoid operatively connected to a braking mechanism; and
a retractor-deployed stay spooled by the torsion bar for selectively restraining opening of a vehicle door.

9. The system of claim 8, wherein the retractor-deployed stay spools to and from the retractor as the vehicle door is translated between a closed configuration and one or more opened configurations.

10. The system of claim 8, wherein the retractor is associated with one of a vehicle body or the vehicle door.

11. The system of claim 8, wherein the retractor brake is manually actuated.

12. The system of claim 8, wherein the retractor brake is operatively connected to a controller which in turn is configured to receive an input from a vehicle door-mounted proximity sensor.

13. The system of claim 8, wherein the door check is a door check arm or strap defining one or more detents engaged by one or more biased rollers.

14. A vehicle including the system of claim 8.

* * * * *